United States Patent
Ikurumi et al.

(10) Patent No.: US 10,745,891 B2
(45) Date of Patent: Aug. 18, 2020

(54) TOOTH ADAPTER AND BUCKET

(71) Applicants: KOMATSU LTD., Tokyo (JP); HENSLEY INDUSTRIES, INC., Dallas, TX (US)

(72) Inventors: Shohei Ikurumi, Tokyo (JP); Dan Yumoto, Tokyo (JP); Stanley Ignacio, Dallas, TX (US); Takanori Nagata, Tokyo (JP)

(73) Assignees: KOMATSU LTD., Tokyo (JP); HENSLEY INDUSTRIES, INC., Dallas, TX (US)

( * ) Notice: Subject to any disclaimer, the term of this patent is extended or adjusted under 35 U.S.C. 154(b) by 0 days.

(21) Appl. No.: 15/906,545

(22) Filed: Feb. 27, 2018

(65) Prior Publication Data
US 2019/0264425 A1  Aug. 29, 2019

(51) Int. Cl.
*E02F 9/28* (2006.01)
(52) U.S. Cl.
CPC ............ *E02F 9/2825* (2013.01); *E02F 9/285* (2013.01); *E02F 9/2833* (2013.01)
(58) Field of Classification Search
CPC ....... E02F 9/2816; E02F 9/2825; E02F 9/285; E02F 9/2833
USPC .............. 37/446, 452–460; 172/701.1–701.3
See application file for complete search history.

(56) References Cited

U.S. PATENT DOCUMENTS

| | | | | |
|---|---|---|---|---|
| 2,987,838 A * | 6/1961 | Stratton | ................ | E02F 9/2841 37/459 |
| 3,790,353 A * | 2/1974 | Jackson | ............... | B23K 35/327 37/460 |
| 3,805,423 A * | 4/1974 | Engel | ..................... | E02F 9/285 172/719 |
| 6,079,132 A * | 6/2000 | Clendenning | ......... | E02F 9/2825 37/450 |
| 8,959,806 B2 * | 2/2015 | Zamorano Jones | ...... | E02F 9/00 37/446 |
| 8,978,277 B2 * | 3/2015 | Knight | .................. | E02F 9/2833 37/456 |
| 9,009,996 B2 * | 4/2015 | Amada | .................... | E02F 9/285 37/452 |
| 2003/0061744 A1 * | 4/2003 | Leslie | ................... | E02F 9/2816 37/452 |
| 2007/0051022 A1 * | 3/2007 | Meyers | ................. | E02F 9/2825 37/455 |
| 2014/0215867 A1 * | 8/2014 | Amada | .................... | E02F 9/285 37/455 |
| 2016/0305095 A1 * | 10/2016 | Kunz | ..................... | E02F 9/2825 |
| 2016/0356023 A1 * | 12/2016 | Ruvang | ................. | E02F 9/2841 |

FOREIGN PATENT DOCUMENTS

JP  2005-105609 A  4/2005

* cited by examiner

*Primary Examiner* — Robert E Pezzuto
(74) *Attorney, Agent, or Firm* — Oliff PLC

(57) ABSTRACT

The tooth adapter partly inserted into a cavity formed in a tooth to hold the tooth with respect to a bucket body includes a connection portion including a proximal end, which is an end of the tooth adapter connected to the bucket body, and an insertion portion including a distal end, which is an end of the tooth adapter inserted into the cavity. The insertion portion includes a base, and a high-hardness portion formed in a region including a surface of the insertion portion, the high-hardness portion being higher in hardness than the base.

15 Claims, 6 Drawing Sheets

TOOTH ADAPTER AND BUCKET

BACKGROUND

The present invention relates to a tooth adapter and a bucket.

A bucket for a hydraulic excavator, wheel loader, or the like has teeth disposed on the edge of its opening. As a way of disposing the teeth on a bucket, tooth adapters are used. The tooth adapters are joined to the edge of the bucket opening by welding or other method. A tooth is held by a tooth adapter in the state where a pan of the tooth adapter is inserted in a cavity formed in the tooth.

When this structure is adopted, sand and other materials will penetrate in between the teeth and the tooth adapters and abrade the tooth adapters. The wearing down of a tooth adapter causes looseness between the tooth adapter and the corresponding tooth, which may even cause cracking of the tooth adapter.

To address such wear of the tooth adapters, it has been proposed to insert a clearance adjuster between a tooth and a tooth adapter (see, for example, Japanese Patent Application Laid-Open No. 2005-105609 (Patent Literature 1)).

With the approach disclosed in Patent Literature 1, the number of parts increases, and high dimensional accuracy is needed for each part. This may lead to an increased production cost and difficulty in working.

Another approach would be to increase the hardness of the tooth adapter to improve the wear resistance. The increased hardness of the tooth adapter, however, results in a decreased toughness thereof, in which case the tooth adapter may become even more susceptible to cracking.

SUMMARY

In view of the foregoing, one of the objects of the present invention is to provide a tooth adapter which is improved in wear resistance and is also capable of suppressing the occurrence of cracking, and to provide a bucket including the tooth adapters.

The tooth adapter according to the present invention is a tooth adapter which is partly inserted into a cavity formed in a tooth of a work machine to hold the tooth with respect to a bucket body of the work machine. The tooth adapter includes: a connection portion including a proximal end, the proximal end being an end of the tooth adapter connected to the bucket body; and an insertion portion including a distal end, the distal end being an end of the tooth adapter inserted into the cavity. The insertion portion includes a base, and a high-hardness portion formed in a region including a surface of the insertion portion, the high-hardness portion being higher in hardness than the base.

The tooth adapter described above is improved in wear resistance and is also capable of suppressing the occurrence of cracking.

DETAILED DESCRIPTION

Outline of Embodiments

Figure 1:
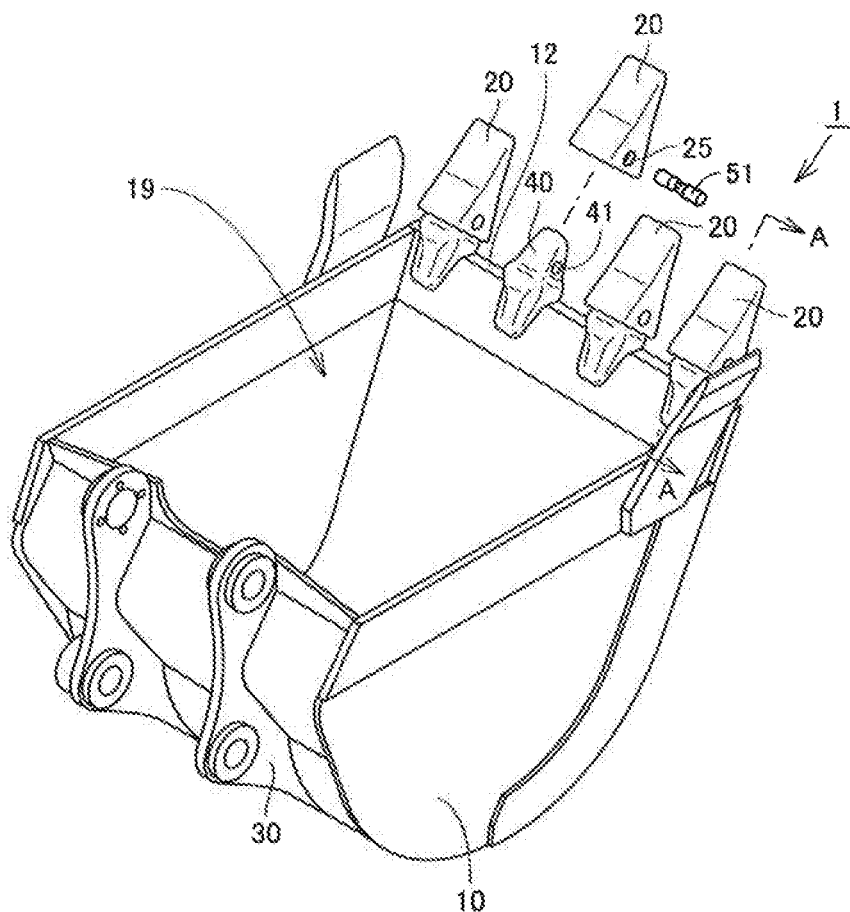
FIG. 1 is a schematic perspective view showing the structure of a bucket including teeth disposed using tooth adapters.

The tooth adapter according to the present application is a tooth adapter which is partly inserted into a cavity formed in a tooth of a work machine to hold the tooth with respect to a bucket body of the work machine. The tooth adapter includes: a connection portion including a proximal end, the proximal end being an end of the tooth adapter connected to the bucket body; and an insertion portion including a distal end, the distal end being an end of the tooth adapter inserted into the cavity. The insertion portion includes a base, and a high-hardness portion formed in a region including a surface of the insertion portion, the high-hardness portion being higher in hardness than the base.

In the tooth adapter according to the present application, the high-hardness portion, having a hardness higher than that of the base, is formed in a region including the surface of the insertion portion. This high-hardness portion serves to prevent wear of the tooth adapter. As a result, it is possible to suppress the occurrence of cracking attributable to the looseness between the tooth adapter and the tooth. Further, the base lower in hardness than the high-hardness portion serves to prevent reduction in toughness of the tooth adapter. As a result, it is possible to reduce the occurrence of cracking due to insufficient toughness. As such, the tooth adapter according to the present application is improved in wear resistance and is also capable of suppressing the occurrence of cracking.

In the tooth adapter described above, the high-hardness portion may include a region of the surface of the insertion portion that comes into contact with the tooth. This more reliably suppresses the occurrence of cracking attributable to the looseness between the tooth adapter and the tooth.

In the tooth adapter described above, the high-hardness portion may include the distal end of the surface of the insertion portion. This more reliably suppresses the occurrence of cracking attributable to the looseness between the tooth adapter and the tooth. This configuration is suitable particularly for a structure in which the tooth adapter has its distal end in the insertion portion coming into contact with the tooth.

In the tooth adapter described above, an end of the surface of the insertion portion on the proximal end side may be included in the base. The end of the surface of the insertion portion on the proximal end side, or, the region of the surface of the insertion portion near the inlet of the cavity of the tooth, suffers strong bending stress from the tooth. When this region is included in the base having high toughness, the risk of cracking due to the bending stress applied from the tooth is reduced.

In the tooth adapter described above, the high-hardness portion may be an induction-hardened portion. The induction-hardened portion having a large hardness gradient in the boundary with respect to the base is suitable for the high-hardness region according to the present application.

In the tooth adapter described above, the high-hardness portion may have a hardness of not less than 47 HRC and not more than 65 HRC. When the hardness of the high-hardness portion is 47 HRC or more, sufficient wear resistance is readily ensured. When the hardness of the high-hardness portion is 65 HRC or less, the toughness of the high-hardness portion is prevented from being decreased more than necessary. The hardness of the high-hardness portion is more preferably 50 HRC or more. The hardness of the high-hardness portion is more preferably 55 HRC or less.

In the tooth adapter described above, the base may have a hardness of not less than 25 HRC and not more than 40 HRC. The base with the hardness of 25 HRC or more ensures sufficient stiffness for the tooth adapter. The base with the hardness of 40 HRC or less ensures sufficient toughness for the tooth adapter.

In the tooth adapter described above, the high-hardness portion may have a thickness of not less than 3 mm and not more than 10 mm. When the thickness of the high-hardness portion is 3 mm or more, sufficient wear resistance is readily ensured. When the thickness of the high-hardness portion is 10 mm or less, sufficient toughness is readily ensured for the tooth adapter.

In the tooth adapter described above, the difference in hardness between the high-hardness portion and the base may be not less than 5 HRC and not more than 25 HRC. This readily achieves a good balance between wear resistance and toughness. The difference in hardness between the high-hardness portion and the base is more preferably 10 HRC or more. The difference in hardness between the high-hardness portion and the base is more preferably 20 HRC or less.

In the tooth adapter described above, it is preferable that the high-hardness portion has a hardness which is not less than a hardness of a region of the tooth that comes into contact with the tooth adapter. This more reliably suppresses the occurrence of cracking attributable to the looseness between the tooth adapter and the tooth.

The bucket according to the present application is a bucket of a work machine. The bucket includes: a bucket body having an opening; the tooth adapter according to the present application, the tooth adapter being disposed on an edge of the opening of the bucket body; and a tooth having a cavity and connected to the bucket body via the tooth adapter received in the cavity.

The bucket according to the present application includes the tooth adapter according to the present application with which the occurrence of cracking is suppressed. The bucket according to the present application therefore provides a highly durable bucket.

Specific Embodiments

Embodiments of the tooth adapter and the bucket according to the present invention will be described below with reference to the drawings. Throughout the drawings, the same or corresponding portions are denoted by the same reference characters, and the description thereof will not be repeated.

First Embodiment

Figure 2:
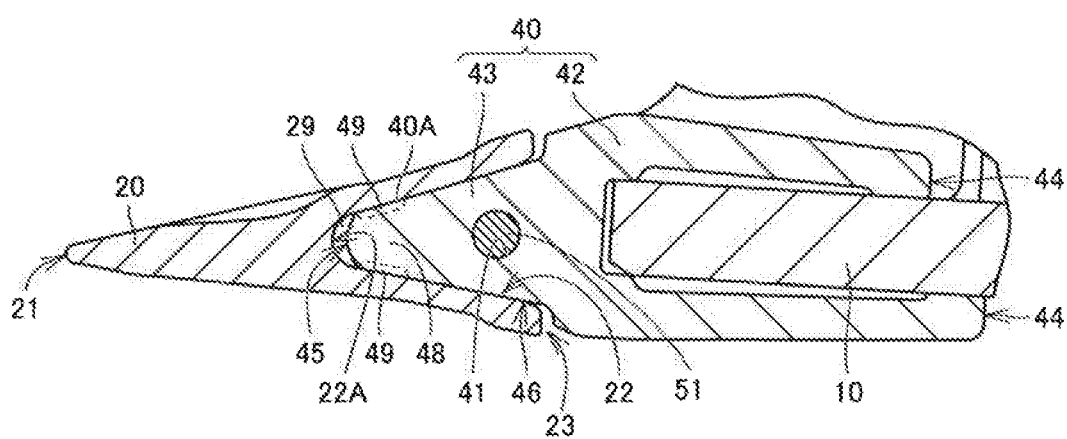
FIG. 2 is a schematic cross-sectional view showing the structure of a tooth adapter according to a first embodiment.

Firstly, a tooth adapter and a bucket according to a first embodiment will be described with reference to FIGS. 1 and 2. FIG. 1 is a schematic perspective view showing the structure of a bucket including teeth disposed using tooth adapters according to the first embodiment. FIG. 2 is a schematic cross-sectional view showing the structure of the tooth adapter according to the first embodiment. FIG. 2 shows a cross section taken along the line A-A in FIG. 1.

Referring to FIG. 1, the bucket 1 in the present embodiment is a bucket for a hydraulic excavator. The bucket 1 is mounted on a distal end of an arm (not shown) of the hydraulic excavator for excavating the soil. The bucket 1 includes a body (bucket body) 10, a plurality of (in the present embodiment, four) tooth adapters 40, a plurality of (in the present embodiment, four) teeth 20, a plurality of pins 51, and a mounting portion 30.

The body 10 is made up of a plate-like member, and has an opening 19 for receiving sand and other materials. The tooth adapters 40 are disposed on an edge 12 of the opening 19 of the body 10 in such a way as to partly protrude from the excavating side of the edge. Each tooth adapter 40 has a through hole, or, an adapter through hole 41 formed therein. The teeth 20 are attached to the corresponding tooth adapters 40 to protrude from the excavating side of the edge 12. Each tooth 20 has a through hole, or, a tooth through hole 25 formed therein. With a tooth 20 attached to a tooth adapter 40, the tooth through hole 25 and the adapter through hole 41 constitute a continuous through hole. A pin 51 is inserted into this continuous through hole to secure the tooth 20 to the tooth adapter 40. The mounting portion 30 is disposed on the body 10, on one side of the opening 19 opposite to the other side where the teeth 20 are attached.

Referring to FIGS. 1 and 2, a tooth 20 has a cavity 22 formed to extend from a proximal end 23 toward a distal end 21 of the tooth. A tooth adapter 40 has a connection portion 42 including a proximal end 44, which is an end of the tooth adapter to be connected to the body 10, and an insertion portion 43 including a distal end 45, which is an end of the tooth adapter to be inserted into the cavity 22. The connection portion 42 has a region of a bifurcated shape on the proximal end 44 side. Stated differently, the connection portion 42 has a groove formed in the region on the proximal end 44 side, which groove has a shape corresponding to the shape of the region (lip plate) including the edge 12 of the body 10 to which the tooth adapter 40 is to be attached. The region including the edge 12 of the body 10 is inserted into this groove. With this, the proximal end 44 side region of the connection portion 42 catches and holds the region including the edge 12 of the body 10. In the present embodiment, the connection portion 42 of the tooth adapter 40 is welded and secured to the region including the edge 12 of the body 10.

The insertion portion 43 includes a base 48, and a high-hardness portion 49. The high-hardness portion 49 is formed in a region including a surface of the insertion portion 43 and is higher in hardness than the base 48. In the present embodiment, the high-hardness portion 49 is an induction-hardened portion. That is, the high-hardness portion 49 is a region formed by hardening a part of the base 48 by induction hardening.

A bottom region 22A of the cavity 22 formed in the tooth 20 does not contact the distal end 45 of the tooth adapter 40.

There is a space 29 between the bottom region 22A of the cavity 22 and the distal end 45. The high-hardness portion 49 is formed on the surface of the insertion portion 43, in the region surrounding the distal end 45. The high-hardness portion 49 is positioned to include a region of the surface of the insertion portion 43 that comes into contact with the tooth 20. More specifically, the high-hardness portion 49 is formed in a portion of the surface of the insertion portion 43 coming into contact with the tooth 20, in such a way as to include a region in the contacting portion that is closest to the distal end 45. The distal end 45 is included in the base 48.

In the tooth adapter 40 in the present embodiment, the high-hardness portion 49 having a hardness higher than that of the base 48 is formed in a region including the surface of the insertion portion 43. The high-hardness portion 49 serves to suppress wear of the tooth adapter 40. As a result, it is possible to suppress the occurrence of cracking attributable to the looseness between the tooth adapter 40 and the tooth 20. The base 48 lower in hardness than the high-hardness portion 49 serves to prevent reduction in toughness of the tooth adapter 40 (particularly, of the insertion portion 43). As a result, it is possible to reduce the occurrence of cracking due to insufficient toughness. The tooth adapter 40 therefore has improved wear resistance and reduced risk of cracking.

Further, in the tooth adapter 40, the high-hardness portion 49 is formed on the surface of the insertion portion 43, in the region coming into contact with the tooth 20. More specifically, the high-hardness portion 49 is formed in a portion of the surface of the insertion portion 43 that comes into contact with the tooth 20, in such a way as to include the region closest to the distal end 45. This is the region most susceptible to wear in the insertion portion 43. The high-hardness portion 49 formed in this region more effectively suppresses the wear of the tooth adapter 40.

On the other hand, an end 46 of the surface of the insertion portion 43 on the proximal end 44 side is included in the base 48. That is, the surface of the insertion portion 43 located near the inlet of the cavity 22 of the tooth 20 is included in the base 48, where no high-hardness portion 49 is formed. The region near the end 46 receives strong bending stress from the tooth 20. With this region being included in the base 48 having high toughness, the risk of cracking due to the bending stress applied from the tooth 20 is reduced.

The tooth adapter 40 is made up of a cast steel, for example. The cast steel has the carbon content of, for example, not less than 0.26 mass % and not more than 0.35 mass %. The carbon content of the cast steel is preferably not less than 0.28 mass % and not more than 0.32 mass %. The cast steel may have a component composition corresponding to, for example, that of a JIS standard carbon steel for machine structural use or alloy steel for machine structural use. More specifically, the component composition of JIS SCNCrM2 or the like, for example, may be adopted as the component composition of the cast steel.

The high-hardness portion 49 preferably has a hardness of not less than 47 HRC and not more than 65 HRC. The hardness of the high-hardness portion 49 is more preferably 50 HRC or more. The hardness of the high-hardness portion 49 is more preferably 55 HRC or less. The high-hardness portion 49 preferably has a thickness of not less than 3 mm and not more than 10 mm. The difference in hardness between the high-hardness portion 49 and the base 48 is preferably not less than 5 HRC and not more than 25 HRC. The difference in hardness between the high-hardness portion 49 and the base 48 is more preferably 10 HRC or more. The difference in hardness between the high-hardness portion 49 and the base 48 is more preferably 20 HRC or less. It is also preferable that the hardness of the high-hardness portion 49 is not less than a hardness of a region of the tooth 20 that comes into contact with the tooth adapter 40.

First Modification

Figure 3:
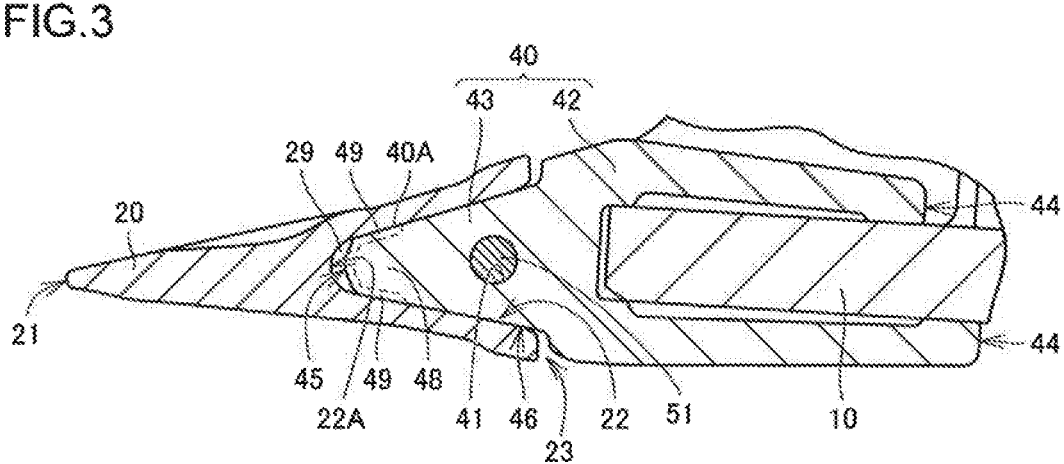
FIG. 3 is a schematic cross-sectional view showing the structure of a first modification of the tooth adapter according to the first embodiment.

FIG. 3 is a schematic cross-sectional view showing the structure of a tooth adapter according to a first modification of the first embodiment. FIG. 3 corresponds to the view in FIG. 2, showing a cross section taken along the line A-A in FIG. 1. Referring to FIG. 3, the tooth adapter 40 according to the first modification basically has a similar structure and produces similar effects as the tooth adapter 40 according to the embodiment described above. The tooth adapter 40 according to the first modification differs from that of the above embodiment in terms of shape of the high-hardness portion 49.

Referring to FIG. 3, the high-hardness portion 49 of the tooth adapter 40 according to the present modification is disposed to include the distal end 45 of the surface of the insertion portion 43. That is, the high-hardness portion 49 is formed in the region facing the space 29, in addition to the region where the high-hardness portion 49 is formed in the above embodiment. Sand and other materials may penetrate into the space 29, and may abrade the region of the surface of the insertion portion 43 including the distal end 45. In such a case, the high-hardness portion 49 formed in the region facing the space 29 as well is capable of suppressing wear of the tooth adapter 40, and more reliably suppressing the occurrence of cracking attributable to the looseness between the tooth adapter 40 and the tooth 20.

Second Modification

Figure 4:
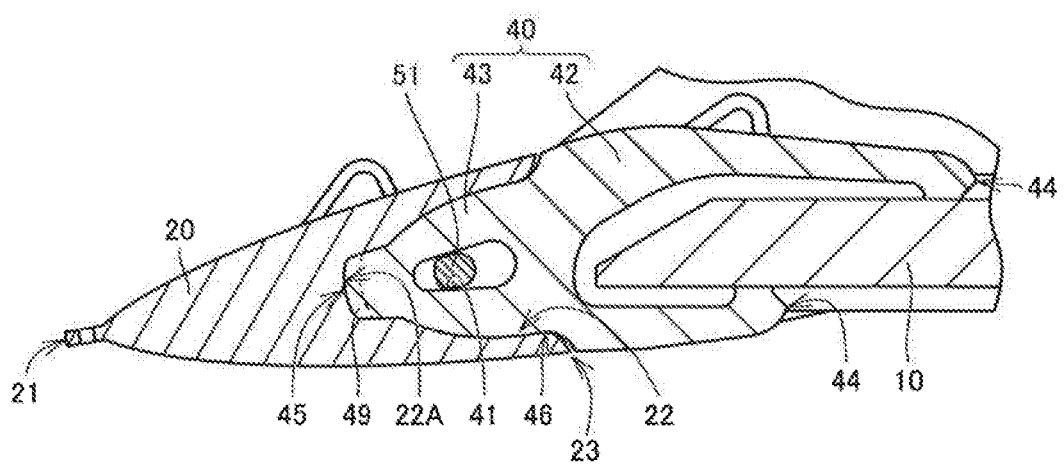
FIG. 4 is a schematic cross-sectional view showing the structure of a second modification of the tooth adapter according to the first embodiment.

FIG. 4 is a schematic cross-sectional view showing the structure of a tooth adapter according to a second modification of the first embodiment. FIG. 4 corresponds to the view in FIG. 2. Referring to FIG. 4, the tooth adapter 40 according to the second modification basically has a similar structure and produces similar effects as the tooth adapter 40 according to the embodiment described above. The tooth adapter 40 according to the second modification differs from that of the above embodiment in terms of shape of the high-hardness portion 49 and manner of contact between the tooth 20 and the tooth adapter 40.

Referring to FIG. 4, in the present modification, the distal end 45 of the insertion portion 43 comes into contact with the bottom region 22A of the cavity 22. The high-hardness portion 49 of the tooth adapter 40 according to the present modification is disposed to include the distal end 45 of the surface of the insertion portion 43. When a structure in which the distal end 45 of the insertion portion 43 contacts the bottom region 22A of the cavity 22 is adopted, wear will advance most severely near the distal end 45. The high-hardness portion 49 disposed to include the distal end 45 of the surface of the insertion portion 43 is capable of suppressing the wear of the tooth adapter 40, and more reliably suppressing the occurrence of cracking attributable to the looseness between the tooth adapter 40 and the tooth 20.

Figure 5:
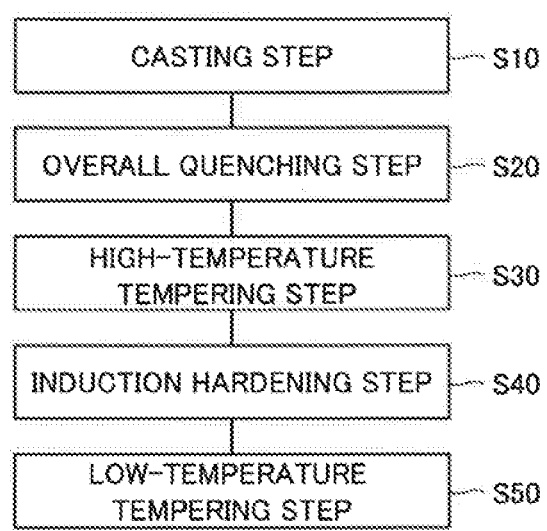
FIG. 5 is a flowchart illustrating the schematic procedure of a method for producing the tooth adapter according to the first embodiment.

A method of producing a tooth adapter 40 according to the present embodiment will now be outlined. FIG. 5 is a flowchart illustrating the schematic procedure of the method of producing the tooth adapter according to the first embodiment. Referring to FIG. 5, in the method of producing the tooth adapter 40 in the present embodiment, firstly, a casting step is performed as a step S10. In this step S10, a molten steel having an appropriate component composition is fed into a mold having a cavity corresponding to a desired shape of tooth adapter 40, and let to solidify. The tooth adapter 40 thus solidified is taken out of the mold.

Next, an overall quenching step is performed as a step S20. In this step S20, the tooth adapter 40 obtained in the step S10 is subjected to quenching processing. Specifically, the tooth adapter 40 is heated in a furnace, for example, to make the tooth adapter 40 as a whole reach a temperature not lower than the $A_3$ transformation point, and then it is rapidly cooled to a temperature not higher than the $M_s$ point. With this, the cast steel constituting the tooth adapter 40 entirely attains a martensitic structure.

Next, a high-temperature tempering step is performed as a step S30. In this step S30, the tooth adapter 40 that has undergone the quenching processing in the step S20 is subjected to tempering processing. Specifically, in a furnace, for example, the tooth adapter 40 as a whole is heated to a temperature lower than the $A_1$ transformation point, within a temperature range of not lower than 400° C. and not higher than 600° C., for example, and then it is cooled to room temperature. With this, the cast steel constituting the tooth adapter 40 entirely attains a tempered martensitic structure. The steps S20 and S30 constitute a thermal refining step. With this themnnal refining step, the structure of the cast steel constituting the tooth adapter 40 is homogenized, and the hardness of the cast steel is adjusted to a desired hardness for the base 48.

Next, an induction hardening step is performed as a step S40. In this step S40, a high-hardness portion 49 is formed in a desired region as an induction-hardened portion, by induction hardening processing. Specifically, a high-frequency current is caused to flow through a coil disposed adjacent to the tooth adapter 40 to generate an eddy current in a desired region of the tooth adapter 40. With this eddy current, a portion where the high-hardness portion 49 is to be formed is heated to a temperature not lower than the As transformation point. At this time, the portion to become the base 48 is maintained at a temperature lower than the $A_1$ transformation point. From this state, the tooth adapter 40 is cooled to a temperature range not higher than the $M_s$ point. In this manner, the high-hardness portion 49 is formed in the desired region (see FIGS. 2 to 4).

Next, a low-temperature tempering step is performed as a step S50. In this step S50, the tooth adapter 40, with the high-hardness portion 49 as the induction-hardened portion formed in the step S40, is subjected to low temperature tempering. Specifically, in a furnace, for example, the tooth adapter 40 as a whole is heated to a temperature lower than the $A_1$ transformation point, within a temperature range of not lower than 150° C. and not higher than 250° C., for example, and then it is cooled to room temperature. This produces some effects such as an effect of reducing the strain introduced to the tooth adapter 40 by formation of the high-hardness portion 49. Thereafter, the tooth adapter 40 is completed through finishing, rust-proofing, painting, and other processes as required. It should be noted that the step S50 may be omitted when toughness of an acceptable level is secured at the end of the step S40.

Second Embodiment

Figure 6:
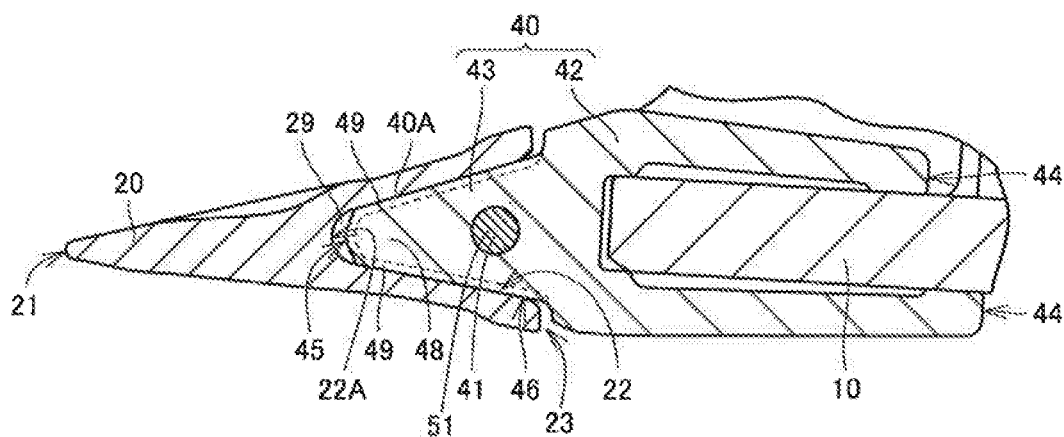
FIG. 6 is a schematic cross-sectional view showing the structure of a tooth adapter according to a second embodiment.

FIG. 6 is a schematic cross-sectional view showing the structure of a tooth adapter according to a second embodiment. FIG. 6 corresponds to the view in FIG. 2, showing a cross section taken along the line A-A in FIG. 1. Referring to FIG. 6, the tooth adapter 40 according to the second embodiment basically has a similar structure and produces similar effects as the tooth adapter 40 according to the first embodiment. The tooth adapter 40 according to the second embodiment differs from that of the first embodiment in terms of shape, structure, and method of formation of the high-hardness portion 49.

Referring to FIG. 6, in the tooth adapter 40 according to the present embodiment, the high-hardness portion 49 is disposed to include an entire surface of the insertion portion 43. Further, the high-hardness portion 49 of the present embodiment is a carburized and quench-hardened portion. That is, the high-hardness portion 49 has its carbon content higher than that of the base 48. Even when such a carburized and quench-hardened portion is adopted as the high-hardness portion 49 in place of the induction-hardened portion, the similar effects as in the first embodiment are obtained. While a description was made in the present embodiment about the case of forming the high-hardness portion 49 to include the entire surface of the insertion portion 43, the high-hardness portion 49 as the carburized and quench-hardened portion may be formed to include a part of the surface of the insertion portion 43 as in the first embodiment.

Figure 7:
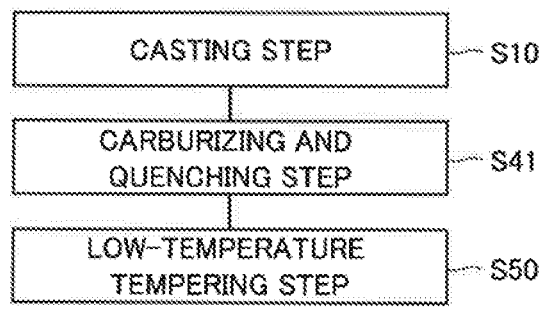
FIG. 7 is a flowchart illustrating the schematic procedure of a method for producing the tooth adapter according to the second embodiment.

A method of producing the tooth adapter 40 according to the present embodiment will now be outlined. FIG. 7 is a flowchart illustrating the schematic procedure of the method of producing the tooth adapter according to the second embodiment. Referring to FIG. 7, in the method of producing the tooth adapter 40 in the present embodiment, firstly, a casting step is performed as a step S10. While this step is performed basically similarly as in the first embodiment, compared to the case of the first embodiment in which a molten steel such as SCNCrM2 having the carbon content of 0.25-0.35 mass % is fed into a mold, in the present embodiment, a molten steel having the carbon content of about 0.18-0.25 mass % is fed into a mold.

Next, with the steps S20 and S30 in the first embodiment omitted, a carburizing and quenching step is performed as a step S41, in place of the step S40 in the first embodiment. In this step S41, with carburizing and quenching processing, a high-hardness portion 49 as a carburized and quench-hardened portion is formed in a desired region, and the hardness of the base 48 is also adjusted to within an appropriate range. Specifically, the tooth adapter 40 obtained in the step S10 is heated to a temperature not lower than the $A_3$ transformation point in an atmosphere having a carbon potential higher than the carbon content of the cast steel constituting the tooth adapter 40. Prior to the heating, a coating layer inhibiting penetration of carbon is formed on a surface corresponding to the region where no high-hardness portion 49 is to be formed. This allows carbon to enter into the tooth adapter 40 from the surface uncovered with the coating layer. From this state, the tooth adapter 40 is cooled to a temperature range of not higher than the $M_3$ point. This allows the high-hardness portion 49 to be formed in the region where the carbon content has increased. The region where the carbon content did not increase is quench-hardened with its initial carbon content maintained, to become a base 48. Thereafter, the step S50 is performed as in the first embodiment, and finishing, rust-proofing, painting and other processes are further performed as required, whereby the tooth adapter 40 according to the second embodiment is completed. The tooth adapter 40 thus obtained has the high-hardness portion 49 formed in a desired region, and also has the base 48 which is excellent in toughness with the hardness (of not less than 30 HRC and not more than 45 HRC, for example) that is lower than the hardness of the high-hardness portion 49.

Third Embodiment

Figure 8:
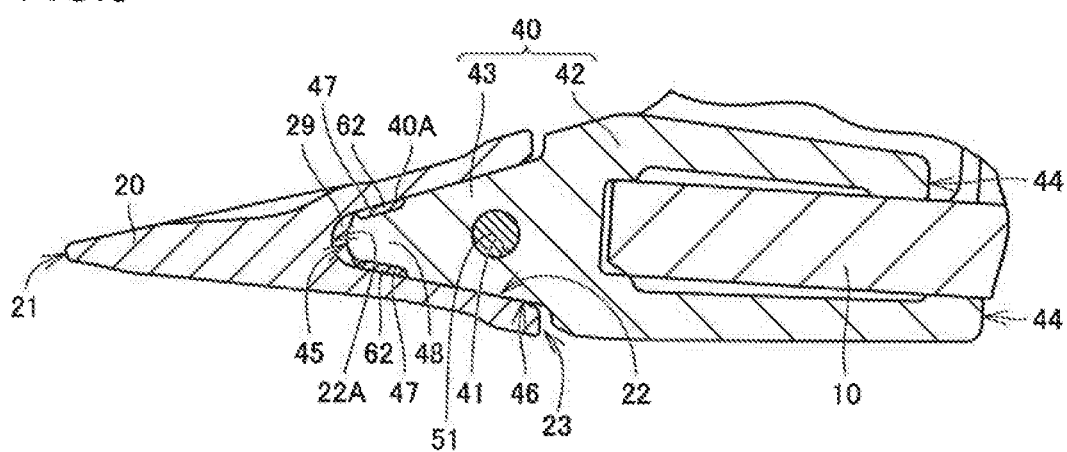
FIG. 8 is a schematic cross-sectional view showing the structure of a tooth adapter according to a third embodiment.
Figure 9:
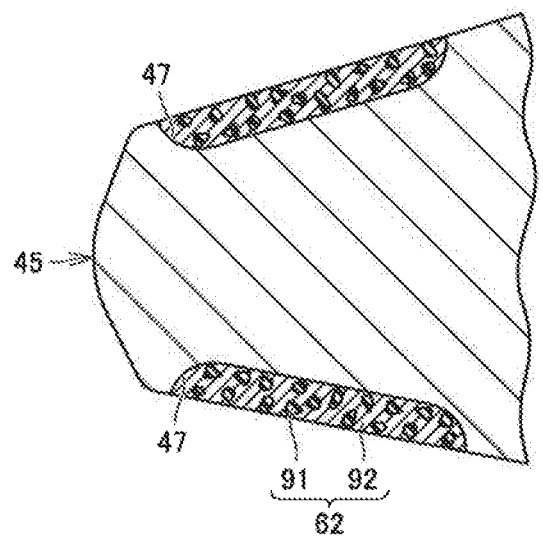
FIG. 9 is a schematic cross-sectional view showing the structure of the tooth adapter near its distal end.

FIG. 8 is a schematic cross-sectional view showing the structure of a tooth adapter according to a third embodiment. FIG. 8 corresponds to the view in FIG. 2, showing a cross section taken along the line A-A in FIG. 1. FIG. 9 is a schematic cross-sectional diagram showing a region near a distal end of the tooth adapter in an enlarged view. Referring to FIGS. 8 and 9, the tooth adapter 40 according to the third embodiment basically has a similar structure and produces similar effects as the tooth adapter 40 according to the first embodiment. The tooth adapter 40 according to the third embodiment differs from that of the first embodiment in terms of structure and method of formation of the high-hardness portion.

Referring to FIGS. 8 and 9, the tooth adapter 40 according to the present embodiment has an overlay portion 62 as the high-hardness portion. As shown in FIG. 9, the overlay portion 62 includes a matrix 92 made up of iron or steel, and hard particles 91 dispersed in the matrix 92. The material constituting the hard particles 91 may be cemented carbide, for example. The tooth adapter 40 has an undercut region 47 formed as a recess. The overlay portion 62 is formed to fill in the undercut region 47. Even when the overlay portion 62 is thus adopted in place of the induction-hardened, high-hardness portion 49, the effects similar to those in the first embodiment are obtained. While a description was made in the present embodiment about the case of forming the overlay portion 62 in a similar region as the high-hardness portion 49 in the first embodiment, the overlay portion 62 may be formed in a different manner; for example, it may be formed in a similar region as in the first or second modification.

Figure 10:
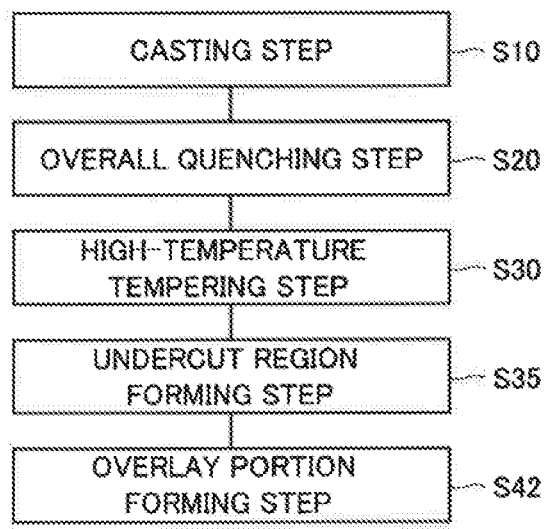
FIG. 10 is a flowchart illustrating the schematic procedure of a method for producing the tooth adapter according to the third embodiment.

A method of producing the tooth adapter 40 according to the present embodiment will now be outlined. FIG. 10 is a flowchart illustrating the schematic procedure of the method of producing the tooth adapter according to the third embodiment. Referring to FIG. 10, in the method of producing the tooth adapter 40 in the present embodiment, firstly, the steps S10 to S30 are performed similarly as in the first embodiment.

Next, in place of the steps S40 and S50 in the first embodiment, an undercut region forming step is performed as a step S35. In this step S35, the tooth adapter 40 that has undergone thermal refining in the steps S20 to S30 is subjected to cutting processing, for example, for formation of an undercut region 47. The undercut region 47 is formed in a region where an overlay portion 62 is to be formed as a high-hardness portion. It should be noted that the undercut region 47 may be formed in the casting step S10.

Next, an overlay portion forming step is performed as a step S42. In this step S42, an overlay portion 62 is formed to fill in the undercut region 47 formed in the step S35. The overlay portion 62 can be formed by, for example, overlaying welding using a metal inert gas (MIG) welding method as described below.

Figure 11:
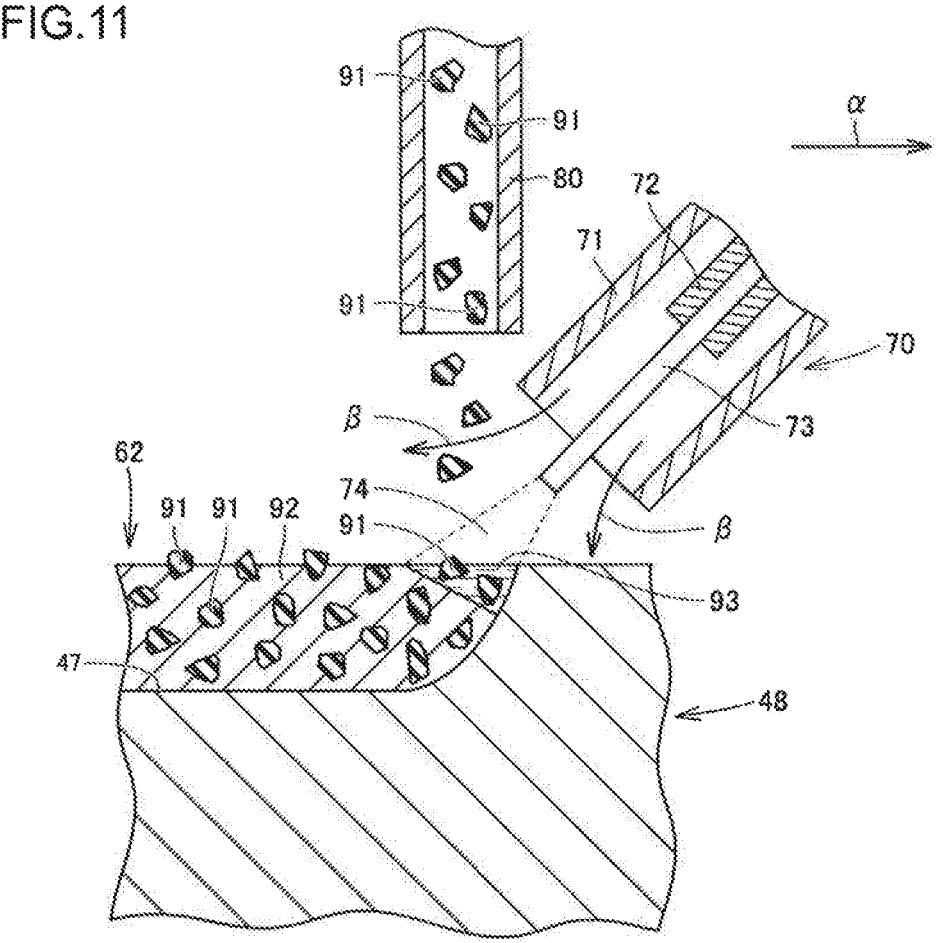
FIG. 11 is a schematic cross-sectional view illustrating a method for forming an overlay portion.

Firstly, an overlay portion forming device will be described. Referring to FIG. 11, the overlay portion forming device includes a welding torch 70 and a hard particles supplying nozzle 80. The welding torch 70 includes a welding nozzle 71 having a hollow cylindrical shape, and a contact tip 72 disposed inside the welding nozzle 71 and connected to a power source (not shown). A welding wire 73, while being in contact with the contact tip 72, is supplied continuously to the distal end side of the welding nozzle 71. For the welding wire, JIS YGW12, for example, may be adopted. A gap between the welding nozzle 71 and the contact tip 72 is a flow path of shielding gas. The shielding gas flowing through the flow path is discharged from the distal end of the welding nozzle 71. The hard particles supplying nozzle 80 has a hollow cylindrical shape. Inside the hard particles supplying nozzle 80, hard particles 91 are supplied, which are discharged from the distal end of the hard particles supplying nozzle 80.

This overlay portion forming device can be used to form an overlay portion 62 in the following procedure. With a base 48 as one electrode and the welding wire 73 as another electrode, voltage is applied across the base 48 and the welding wire 73. This generates an arc 74 between the welding wire 73 and the base 48. The arc 74 is shielded from the ambient air by the shielding gas discharged from the distal end of the welding nozzle 71 along the arrows β. For the shielding gas, argon, for example, may be adopted. The heat in the arc 74 melts a part of the base 48 and also melts the distal end of the welding wire 73. The thus molten distal end of the welding wire 73 forms droplets, which transfer to the molten region of the base 48. This forms a molten pool 92, which is a liquid region in which the molten base 48 and the molten welding wire 73 are mixed together. The hard particles 91 discharged from the hard particles supplying nozzle 80 are supplied to this molten pool 92.

As the welding torch 70 and the hard particles supplying nozzle 80 constituting an overlaying welding device move relatively in the direction shown by the arrow a with respect to the base 48 (undercut region 47), the position where the molten pool 92 is formed moves accordingly. The molten pool 92 previously formed solidifies, resulting in an overlay portion 62. The overlay portion 62 includes a matrix 92 formed by solidification of the molten pool 92, and hard particles 91 dispersed in the matrix 92. Through the above procedure, the overlay portion 62 is formed, filling in the undercut region 47. Thereafter, finishing, rust-proofing, painting, and other processes are performed as required, whereby the tooth adapter 40 according to the third embodiment is completed.

While a description was made in the above embodiments about the case where the bucket of the present application is for a hydraulic excavator, the tooth adapter and the bucket according to the present application have other applications; for example, they are applicable to a bucket for a wheel loader or a ripper for a bulldozer.

It should be understood that the embodiments disclosed herein are illustrative and non-restrictive in every respect. The scope of the present invention is defined by the terms of the claims, rather than by the foregoing description, and is intended to include any modifications within the scope and meaning equivalent to the terms of the claims.

What is claimed is:

1. A tooth adapter configured to be partly inserted into a cavity formed in a tooth of a work machine so as to hold the tooth with respect to a bucket body of the work machine, the tooth adapter comprising:
    a connection portion including a proximal end, the proximal end being an end of the tooth adapter connected to the bucket body; and
    an insertion portion configured to be inserted into the cavity formed in the tooth, the insertion portion including:
        a distal end, which is an end of the tooth adapter configured to be inserted into the cavity formed in the tooth and be in direct contact with a bottom region of the cavity, a base extending from the connection portion to the distal end, the base linearly tapering towards the distal end, and a high-hardness portion formed along the entire distal such that the high-hardness portion is in contact with the entire bottom region of the cavity, the high-hardness portion having a hardness greater than a hardness of the base.

2. The tooth adapter according to claim 1, wherein the high-hardness portion includes a region of the surface of the insertion portion that comes into contact with the tooth.

3. The tooth adapter according to claim 1, wherein the high-hardness portion includes a distal end of the surface of the insertion portion.

4. The tooth adapter according to claim 2, wherein the high-hardness portion includes a distal end of the surface of the insertion portion.

5. The tooth adapter according to claim 1, wherein the proximal end is included in the base.

6. The tooth adapter according to claim 2, wherein the proximal end is included in the base.

7. The tooth adapter according to claim 3, wherein the proximal end is included in the base.

8. The tooth adapter according to claim 4, wherein the proximal end is included in the base.

9. The tooth adapter according to claim 1, wherein the high-hardness portion is induction-hardened.

10. The tooth adapter according to claim 1, wherein the hardness of the high-hardness portion is not less than 47 HRC and not more than 65 HRC.

11. The tooth adapter according to claim 1, wherein the hardness of the base is not less than 25 HRC and not more than 40 HRC.

12. The tooth adapter according to claim 1, wherein the high-hardness portion has a thickness of not less than 3 mm and not more than 10 mm.

13. The tooth adapter according to claim 1, wherein a difference in hardness between the high-hardness portion and the base is not less than 5 HRC and not more than 25 HRC.

14. The tooth adapter according to claim 1, wherein the hardness of the high-hardness portion is not less than a hardness of a region of the tooth that is configured to contact the tooth adapter.

15. A bucket of a work machine, the bucket comprising:
a bucket body having an opening;
the tooth adapter according to claim 1, the tooth adapter being disposed on an edge of the opening of the bucket body; and
the tooth having the cavity and connected to the bucket body via the tooth adapter received in the cavity.

* * * * *